US012205355B2

(12) United States Patent
Li et al.

(10) Patent No.: US 12,205,355 B2
(45) Date of Patent: *Jan. 21, 2025

(54) METHOD, DEVICE, AND COMPUTER READABLE STORAGE MEDIUM FOR IMAGE PROCESSING

(71) Applicant: NEC CORPORATION, Tokyo (JP)

(72) Inventors: Yan Li, Beijing (CN); Ni Zhang, Beijing (CN)

(73) Assignee: NEC CORPORATION, Tokyo (JP)

( * ) Notice: Subject to any disclaimer, the term of this patent is extended or adjusted under 35 U.S.C. 154(b) by 494 days.

This patent is subject to a terminal disclaimer.

(21) Appl. No.: 17/558,974

(22) Filed: Dec. 22, 2021

(65) Prior Publication Data

US 2022/0207866 A1 Jun. 30, 2022

(30) Foreign Application Priority Data

Dec. 25, 2020 (CN) .......................... 202011562478.5

(51) Int. Cl.
*G06V 10/774* (2022.01)
*G06T 5/50* (2006.01)
(Continued)

(52) U.S. Cl.
CPC ............ *G06V 10/7747* (2022.01); *G06T 5/50* (2013.01); *G06T 5/70* (2024.01); *G06T 7/10* (2017.01)

(58) Field of Classification Search
CPC .. G06V 10/774; G06V 10/7747; G06V 20/70; G06T 5/50; G06T 5/70;
(Continued)

(56) References Cited

U.S. PATENT DOCUMENTS 10,311,556 B1 * 6/2019 Farivar ................. G06F 18/214
10,540,757 B1 * 1/2020 Bouhnik ................. G06T 3/14
(Continued)

FOREIGN PATENT DOCUMENTS

CN 110569698 A * 12/2019 ......... G06K 9/00664
JP 2019-125116 A 7/2019
(Continued)

OTHER PUBLICATIONS

Hariharan et al. "Semantic contours from inverse detectors." 2011 international conference on computer vision. IEEE, 2011. (Year: 2011).*

(Continued)

*Primary Examiner* — Edward F Urban
*Assistant Examiner* — Benedict E Lee
(74) *Attorney, Agent, or Firm* — Sughrue Mion, PLLC

(57) ABSTRACT

Embodiments of the present disclosure relate to a method, device and computer-readable storage medium for image processing. A method for image processing comprises: obtaining a first image and at least one second image, wherein each image of the at least one second image is a transformed image of the first image; and generating a first semantic segmentation label for the first image based on at least one semantic prediction result of the at least one second image. By using the first image and the first semantic segmentation label as training data to train an image semantic segmentation model, it helps to increase the precision of the trained image semantic segmentation model.

16 Claims, 8 Drawing Sheets

(51) Int. Cl.
*G06T 5/70* (2024.01)
*G06T 7/10* (2017.01)

(58) Field of Classification Search
CPC . G06T 7/10; G06T 7/215; G06T 2207/20081; G06T 2207/20084; G06T 7/11
See application file for complete search history.

(56) References Cited

U.S. PATENT DOCUMENTS

| | | | | |
|---|---|---|---|---|
| 11,127,139 | B2* | 9/2021 | Zhang | G06T 7/11 |
| 11,170,581 | B1* | 11/2021 | Marek | G06V 10/774 |
| 11,205,271 | B2* | 12/2021 | Dai | G06N 3/045 |
| 11,341,736 | B2* | 5/2022 | Zhang | G06V 10/757 |
| 11,463,631 | B2* | 10/2022 | Zhang | G06V 40/166 |
| 11,587,210 | B1* | 2/2023 | Chen | G06T 3/047 |
| 11,636,602 | B1* | 4/2023 | Havír | G06V 10/774 |
| | | | | 382/164 |
| 11,743,426 | B2* | 8/2023 | Bogdanovych | G06N 3/084 |
| | | | | 382/160 |
| 2021/0150276 | A1* | 5/2021 | Liu | G06F 18/2148 |
| 2022/0101112 | A1* | 3/2022 | Brown | G10L 15/18 |
| 2023/0049590 | A1* | 2/2023 | Bauer | G06V 10/774 |

FOREIGN PATENT DOCUMENTS

| | | |
|---|---|---|
| JP | 2020-194446 A | 12/2020 |
| JP | 2022-155690 A | 10/2022 |
| WO | 2019/171546 A1 | 9/2019 |
| WO | 2019/180848 A1 | 9/2019 |
| WO | 2020/003434 A1 | 1/2020 |
| WO | 2020/121564 A1 | 6/2020 |
| WO | 2021/033242 A1 | 2/2021 |

OTHER PUBLICATIONS

Japanese Office Action dated May 30, 2023 in Japanese Application No. 2021-211199.
Smilkov et al., "SmoothGrad: removing noise by adding noise", [online], 2017, https://arxiv.org/abs/1706.03825, (10 pages total).

* cited by examiner though the following disclosure and claims, the objects,
METHOD, DEVICE, AND COMPUTER READABLE STORAGE MEDIUM FOR IMAGE PROCESSING

FIELD

Embodiments of the present disclosure relate to the field of image processing, and more specifically, to a method, device and computer-readable storage medium for image processing.

BACKGROUND

Image semantic segmentation is an important technology in the field of image processing and computer vision, which is the basis of image understanding. Image semantic segmentation refers to classifying each pixel in an image and determining the semantic category of each pixel (such as belonging to background, person(s) or vehicle(s), etc.), to partition the image area according to different semantic categories.

Usually, an image semantic segmentation model (e.g., deep neural network) may be trained based on a training dataset, to realize image semantic segmentation. A training sample in the training dataset may comprise a training image and semantic segmentation labels annotated for the training image. In some cases, semantic segmentation labels annotated for the training image might be inaccurate, which are also referred to as "noisy labels". If the image semantic segmentation model is trained using training samples with noisy labels, then it will be difficult for the trained image semantic segmentation model to produce correct semantic segmentation results.

SUMMARY

Embodiments of the present disclosure provide a solution for image processing.

In a first aspect of the present disclosure, there is provided a method for image processing. The method comprises: obtaining a first image and at least one second image, wherein each image of the at least one second image is a transformed image of the first image; and generating a first semantic segmentation label for the first image based on at least one semantic prediction result of the at least one second image.

In a second aspect of the present disclosure, there is provided a computing device. The computing device comprises at least one processor, and the at least one processor is configured to: obtain a first image and at least one second image, wherein each image of the at least one second image is a transformed image of the first image; and generate a first semantic segmentation label for the first image based on at least one semantic prediction result of the at least one second image.

In a third aspect of the present disclosure, there is provided a computer-readable storage medium. The computer-readable storage medium comprises machine-executable instructions stored thereon which, when being executed by a device, cause the device to perform any step of a method according to the first aspect of the present disclosure.

In a fourth aspect of the present disclosure, there is provided a computer program product. The computer program product is tangibly stored in a computer-readable storage medium and comprises machine-executable instructions which, when being executed by a device, cause the device to perform any step of a method according to the first aspect of the present disclosure.

This Summary is provided to introduce a selection of concepts in a simplified form that are further described below in the Detailed Description. This Summary is not intended to identify key features or essential features of the present disclosure, nor is it intended to be used to limit the scope of the present disclosure. Other features of the present disclosure will become easy to understand from the description below.

BRIEF DESCRIPTION OF THE DRAWINGS

Through the following disclosure and claims, the objects, advantages and other features of the present invention will become more apparent. For illustrative purpose only, non-limiting description of preferable embodiments is provided with reference to the accompanying drawings, wherein:

Throughout the figures, the same or corresponding reference signs denote the same or corresponding parts.

DETAILED DESCRIPTION OF EMBODIMENTS

Figure 1:
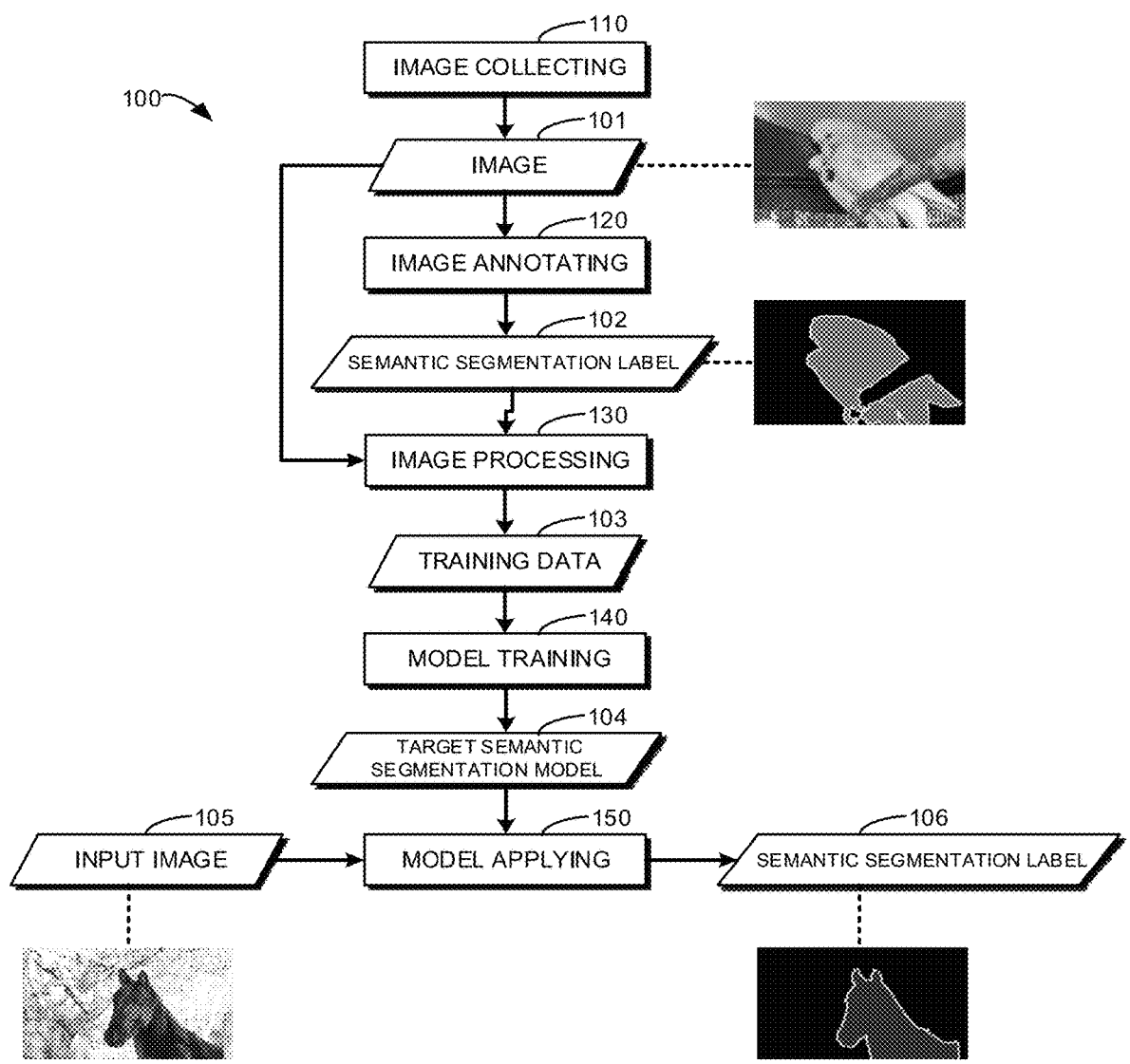
FIG. 1 shows a schematic block diagram of an image processing system according to embodiments of the present disclosure.

The embodiments will be described in more detail with reference to the accompanying drawings, in which some embodiments of the present disclosure have been illustrated. However, the present disclosure can be implemented in various manners, and thus should not be construed to be limited to embodiments disclosed herein. On the contrary, those embodiments are provided for the thorough and complete understanding of the present disclosure, and completely conveying the scope of the present disclosure to those skilled in the art. It should be understood that the drawings and embodiments of the present disclosure are only used for illustrative purpose, rather than limiting the protection scope of the present disclosure.

The terms "comprise" and its variants used here are to be read as open terms that mean "include, but is not limited to". The term "based on" is to be read as "based at least in part on". The term "one embodiment" or "the embodiment" is to be read as "at least one embodiment". The terms "first," "second" and the like may refer to different or the same objects. Other definitions, explicit and implicit, might be included below.

The term "circuitry" used herein may refer to hardware circuits and/or combinations of hardware circuits and software. For example, the circuitry may be a combination of analog and/or digital hardware circuit(s) with software/firmware. As another example, the circuitry may be any portions of hardware processor(s) with software (including digital signal processor(s)), software, and memory(ies) that work together to cause a device to perform various functions. In a further example, the circuitry may be hardware circuit(s) and/or processor(s), such as a microprocessor(s) or a portion of a microprocessor(s), that requires software/firmware for operation, but the software may not be present when it is not needed for operation. The term "circuitry" used herein also covers an implementation of merely a hardware circuit or a processor, or a portion of a hardware circuit or a processor, and its (or their) accompanying software and/or firmware.

As described above, the image semantic segmentation model (e.g., deep neural network) is usually trained based on a training dataset, to realize image semantic segmentation. A training sample in the training dataset may comprise a training image and semantic segmentation labels annotated for the training image. Semantic segmentation labels of the training image may be manually annotated. If the annotator has insufficient experience or the image itself is difficult to annotate, the annotated semantic segmentation label might be inaccurate. In some cases, semantic segmentation labels of the training image may be batch-annotated using some devices, to reduce the cost of manual annotating. In these cases, semantic segmentation labels of the training image also might be inaccurate, which are also referred to as "noisy labels". If the image semantic segmentation model is trained using training samples with noisy labels, then it will be difficult for the trained image semantic segmentation model to produce correct semantic segmentation results.

Embodiments of the present disclosure propose a solution for image processing, to solve the above and/or other potential problems.

In some embodiments, a first image and at least one second image may be obtained, wherein each image of the at least one second image is a transformed image of the first image. Then, a first semantic segmentation label for the first image is generated based on at least one semantic prediction result of the at least one second image. By training an image semantic segmentation model using the first image and the first semantic segmentation label as training data, it helps to increase the precision of the trained image semantic segmentation model.

Additionally or alternatively, in other embodiments, a plurality of images and a first set of semantic segmentation labels of the plurality of images may be obtained. In addition, a plurality of image masks corresponding to the plurality of images may be obtained, wherein each image mask is used for selecting a target area (e.g., area with lower noise) in a corresponding image of the plurality of images. Then, a second set of semantic segmentation labels of the plurality of images are generated based on the plurality of image masks and the first set of semantic segmentation labels; and a mixed image and a semantic segmentation label for the mixed image are generated based on the plurality of images and the second set of semantic segmentation labels. By training an image semantic segmentation model using the generated mixed image and its semantic segmentation label as training data, it helps to further reduce the impact of noisy labels on the model training, thereby increasing the precision of the trained image semantic segmentation model.

Embodiments of the present disclosure will be described in detail with reference to the accompanying drawings. As used herein, the term "model" can handle inputs and provide corresponding outputs. Take a neural network model as an example, it usually includes an input layer, an output layer and one or more hidden layers between the input layer and the output layer. The model (also referred to as "deep learning model") used in the deep learning applications usually includes a plurality of hidden layers to extend the depth of the network. Individual layers of the neural network model are connected in sequence, such that an output of a preceding layer is provided as an input for a following layer, where the input layer receives an input from the neural network while the output of the output layer acts as the final output of the neural network. Each layer of the neural network model includes one or more nodes (also referred to as processing nodes or neurons) and each node processes the input from the preceding layer. The terms "neural network," "model," "network" and "neural network model" herein may be used interchangeably.

FIG. 1 shows a schematic block diagram of an image processing system 100 according to embodiments of the present disclosure. As shown in FIG. 1, the system 100 may comprise an image collecting apparatus 110, an image annotating apparatus 120, an image processing apparatus 130, a model training apparatus 140 and a model applying apparatus 150. In some embodiments, the above multiple apparatuses may be implemented in different physical equipment. Alternatively, at least one portion of the above multiple apparatuses may be implemented in the same physical equipment. It should be understood that the system 100 shown in FIG. 1 is merely one example in which embodiments of the present disclosure may be implemented, and is not intended to limit the scope of the present disclosure. Embodiments of the present disclosure are also applicable to other systems or architectures.

The image collecting apparatus 110 may collect an image set 101 for training a model. It should be understood that an image in the image set 101 may be an image in any format. In addition, the image collecting apparatus 110 may collect the image set 101 by using any method that is known or will be developed in future. The scope of the present disclosure is not limited in this regard.

The image annotating apparatus 120 may generate a semantic segmentation label 102 (also referred to as "initial semantic segmentation label" herein) for each image 101 to indicate the semantic category of each pixel in the image. The semantic category of a pixel refers to the category of an object corresponding to the pixel in the image. Objects in the image may include, without limitation to, background, persons, animals, vehicles, etc. For example, the generated semantic segmentation label may be a vector or an array indicating the true semantic category of each pixel, or may be a visual image as shown in FIG. 1, wherein pixels belonging to different semantic categories may be identified by different colors. It should be understood that image annotation may be done manually. In this case, the image annotating apparatus 120 may be an apparatus or a device that is manually controlled to annotate each pixel in each image 101.

The image set 101 and corresponding semantic segmentation labels 102 may be provided to the image processing apparatus 130. The image processing apparatus 130 may process the image set 101 and corresponding semantic segmentation labels 102 to generate a training dataset 103 that comprises a plurality of training samples.

In some embodiments, the image processing apparatus 130 may perform image augmentation on the image 101 (also referred to as the "first image" below) in the image set 101 to obtain at least one transformed image (also referred to as the "at least one second image" below) of the first image. The image processing apparatus 130 may determine at least one semantic prediction result of the at least one second image. For example, for each transformed image of the at least one transformed image, the image processing apparatus 130 may generate a semantic segmentation label or a semantic confidence label for the transformed image as a semantic prediction result of the transformed image, wherein the semantic confidence label may indicate a corresponding probability that each pixel in the transformed image belongs to a plurality of predetermined semantic categories. The image processing apparatus 130 may generate a semantic segmentation label for the first image based on the at least one semantic prediction result. For example, the first image 101 and the generated semantic segmentation label may be used as a training sample in the training dataset 103.

Additionally or alternatively, in some embodiments, the image processing apparatus 130 may obtain a plurality of images 101 from the image set 101. The image processing apparatus 130 may obtain a first set of semantic segmentation labels of the plurality of images 101. For example, a semantic segmentation label in the first set of semantic segmentation labels may be an initial semantic segmentation label 102 of the corresponding image 101 of the plurality of images 101. For another example, a semantic segmentation label in the first set of semantic segmentation labels may be a semantic segmentation label which is generated based on the at least one semantic prediction result of the at least one transformed image of the corresponding image 101, just as described above. The image processing apparatus 130 may obtain a plurality of image masks corresponding to the plurality of images 101, each image mask being used for selecting a target area in the corresponding image 101. The target area may comprise a plurality of pixels in the image 101 whose semantic category is easy to predict, i.e., an area with lower noise degree, which is also referred to as a "non-noisy area". The image processing apparatus 130 may generate a second set of semantic segmentation labels of the plurality of images 101 based on the plurality of image masks and the first set of semantic segmentation labels. For example, for each image of the plurality of images 101, the image processing apparatus 130, by performing a masking operation (i.e., point multiplication) on the image mask corresponding to the image and the semantic segmentation label corresponding to the image in the first set of semantic segmentation labels, may select the part of the semantic segmentation label corresponding to those pixels in the target area and ignore the part corresponding to those pixels in the non-target area, thereby obtaining the semantic segmentation label corresponding to the image in the second set of semantic segmentation labels. Then, the image processing apparatus 130 may generate a mixed image and a semantic segmentation label for the mixed image based on the plurality of images 101 and the second set of semantic segmentation labels. For example, the generated mixed image and its semantic segmentation label may be used as a training sample in the training dataset 103.

Additionally or alternatively, in some embodiments, the image processing apparatus 130 may also use each original image 101 and its corresponding initial semantic segmentation label 102 as a training sample in the training dataset 103.

In this way, the image processing apparatus 130 may generate the training dataset 103 that comprises a plurality of training samples. The training dataset 103 may be provided to the model training apparatus 140 to be used for training a target semantic segmentation model 104.

The target semantic segmentation model 104 may be trained to predict the semantic category to which each pixel in an image which is input to the target semantic segmentation model 104 belongs. For example, the model training apparatus 140 may perform model training based on the training dataset 103 to determine a model parameters of the target semantic segmentation model 104. The trained target semantic segmentation model 104 (e.g., the determined model parameters) may be provided to the model applying apparatus 150. The model applying apparatus 150 may obtain an input image 105 and predict the semantic category of each pixel in the input image 105 by using the trained target semantic segmentation model 104. The model applying apparatus 150 may generate a semantic segmentation label 106, which indicates the input image 105, based on a prediction result. For example, the generated semantic segmentation label 106 may be a vector or an array that indicates the semantic category of each pixel in the input image 105, or may be a visual image as shown in FIG. 1, wherein pixels of different semantic categories may be filled with different colors.

The target semantic segmentation model 104 may be applied to various fields. In the medical field, the image semantic segmentation model can perform semantic segmentation for various input medical images, thereby identifying and understanding lesions therein to help doctors to diagnose diseases. For example, a method for processing a medical image may comprise: obtaining an input medical image; generating a semantic segmentation label for the medical image using the trained image semantic segmentation model, wherein the semantic segmentation label indicates a semantic category of a pixel in the medical image; and identifying lesions in the medical image based on the semantic segmentation label. In the autopilot field, the image semantic segmentation model may be used to perform semantic segmentation on an image captured by a vehicle during driving, thereby recognizing and understanding a street view in the image to help an autopilot system to make driving decisions, etc. For example, an autopilot method may comprise: obtaining an image captured by a vehicle during driving; generating a semantic segmentation label for the image using the trained image semantic segmentation model, wherein the semantic segmentation label indicates a semantic category of a pixel in the image; recognizing a street view in the image based on the semantic segmentation label; and generating an autopilot decision based on the recognized result.

Operations performed by the image processing apparatus 130 as shown in FIG. 1 will be described in detail with reference to FIGS. 2 and 3. It should be understood that the image processing apparatus 130 may only perform image processing operations as shown in FIG. 2, or only perform image processing operations as shown in FIG. 3, or first perform image processing operations as shown in FIG. 2 and then perform image processing operations as shown in FIG. 3.

Figure 2:
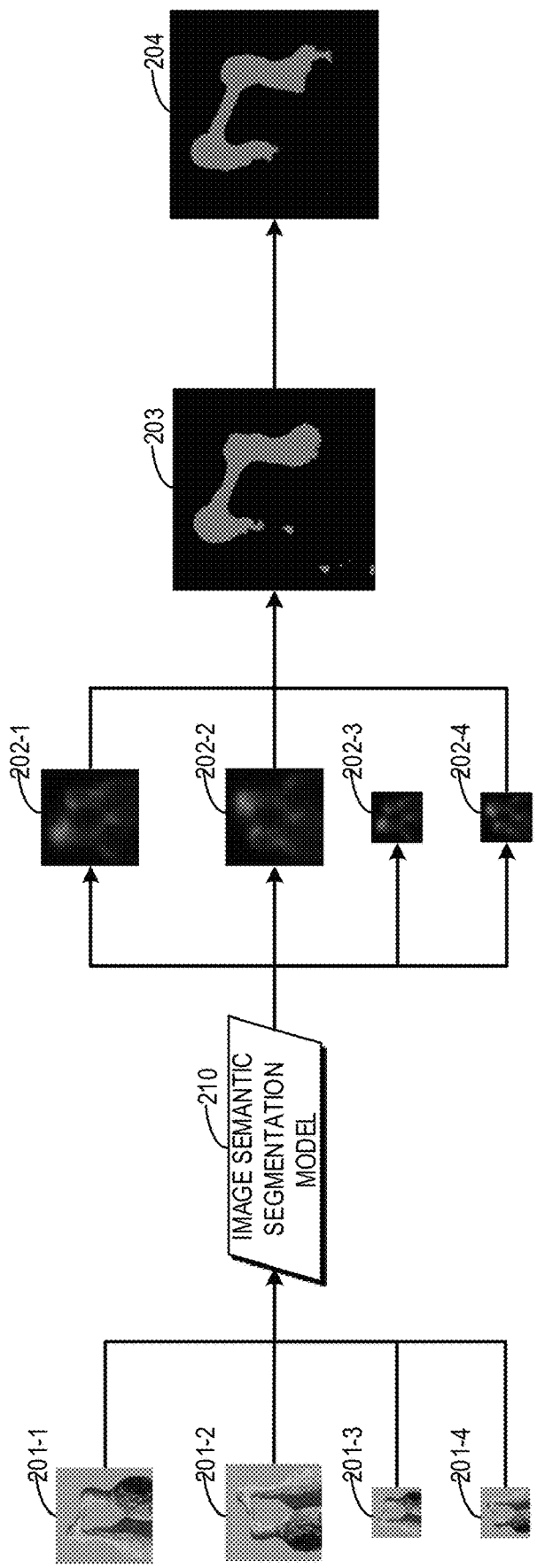
FIG. 2 shows a schematic view for image processing according to embodiments of the present disclosure.
Figure 3:
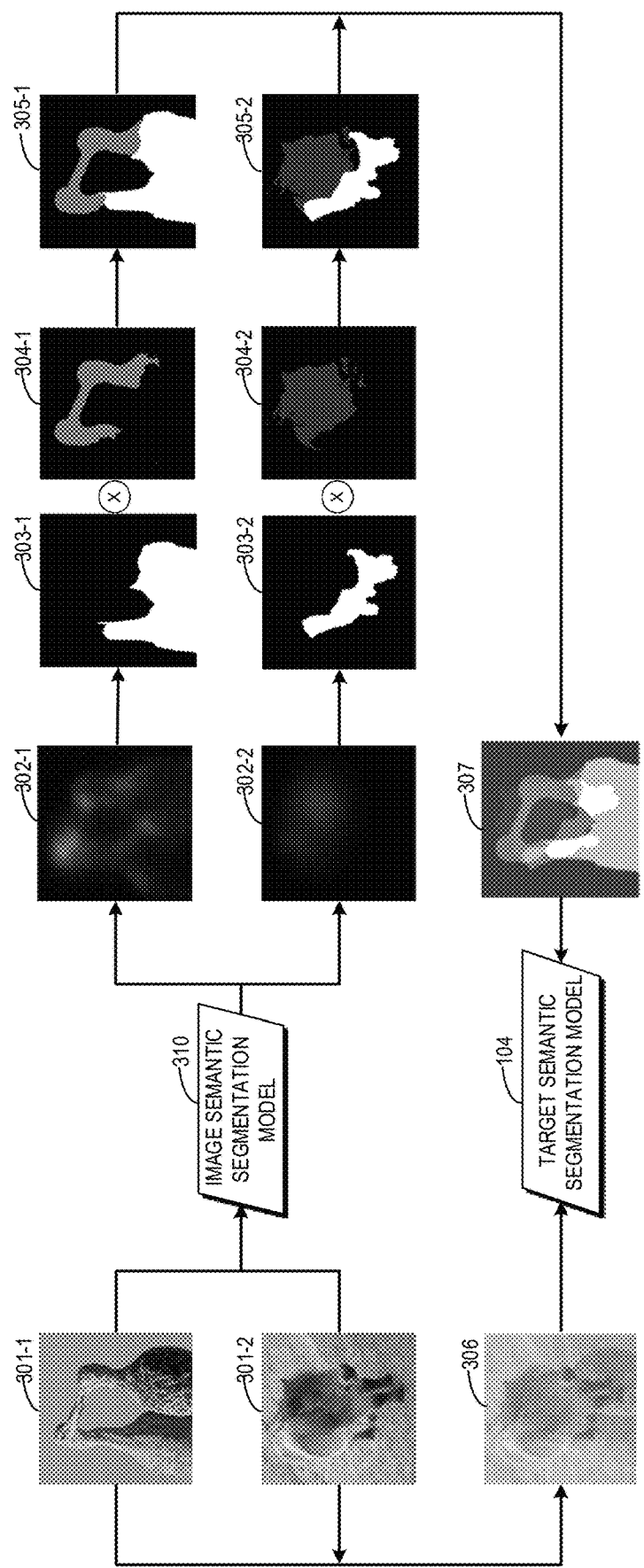
FIG. 3 shows a schematic view for image processing according to embodiments of the present disclosure.

FIG. 2 shows a schematic view of image processing according to embodiments of the present disclosure. This figure shows a plurality of transformed images 201-1, 201-2 . . . 201-4 (collectively or separately referred to as "transformed image 201") that result from performing image augmentation on the image 101 from the image set 101. For example, image augmentation may include, but not limited to, mirror transformation, rotation, scaling, cropping, translation, brightness modification, adding noise, and changing colors, etc.

As shown in FIG. 2, the image processing apparatus 130 may use an image semantic segmentation model 210 to predict the semantic category of a pixel in each transformed image 201, to generate a semantic prediction result of each transformed image 201. The image semantic segmentation model 210 may be the same as or different to the target semantic segmentation model 104 as shown in FIG. 1. For example, the image semantic segmentation model 210 may be a pre-trained image semantic segmentation model, a preliminarily trained image semantic segmentation model, or an image semantic segmentation model trained using training samples with noisy labels. That is, the image semantic segmentation model 210 may be implemented using a semantic segmentation model with lower prediction accuracy, or other algorithm or apparatus that can realize the function of semantic segmentation. In some embodiments, the semantic prediction result of each transformed image 201 may be represented as a semantic segmentation label for the transformed image 201, which indicates the semantic category to which each pixel in the transformed image 201 belongs. Alternatively, in other embodiments, the semantic prediction result of each transformed image 201 may be represented as a semantic confidence label for the transformed image 201, which indicates a corresponding probability that each pixel in the transformed image 201 belongs to a plurality of predetermined semantic categories. As shown in FIG. 2, for example, a prediction result for the transformed image 201-1 is represented as a semantic confidence label 202-1, a prediction result for the transformed image 201-2 is represented as a semantic confidence label 202-2, a prediction result for the transformed image 201-3 is represented as a semantic confidence label 202-3, and a prediction result for the transformed image 201-4 is represented as a semantic confidence label 202-4. Hereinafter, the semantic confidence labels 201-1~202-4 may be collectively or separately referred to as "semantic confidence label 202".

The image processing apparatus 130 may generate a semantic segmentation label 203 of the original image 101 based on the semantic prediction results of the plurality of transformed images 201. For example, the image processing apparatus 130 may first perform the inverse transformation corresponding to the image augmentation on the plurality of semantic confidence labels 202 of the plurality of transformed images 201 respectively, and then integrate the plurality of transformed semantic confidence labels to generate an integrated semantic confidence label. The integrated semantic confidence label may indicate the confidence of each pixel in the original image 101 belonging to a plurality of predetermined semantic categories. Then, for each pixel in the original image 101, the image processing apparatus 130 may determines a semantic category with the highest confidence as the semantic category to which the pixel belongs, thereby generating the semantic segmentation label 203. Optionally, in some embodiments, the image processing apparatus 130 may further smooth the generated semantic segmentation label 203 to obtain an optimized semantic segmentation label 204. It should be understood that the smooth operation may be based on any appropriate algorithm that is known or will be developed in future, e.g., Conditional Random Field (CRF) algorithm.

FIG. 3 shows a plurality of images 301-1 and 301-2 (obtained from the image set 101) and their corresponding semantic segmentation labels 304-1 and 304-2. For example, the semantic segmentation label 304-1 may be an initial semantic segmentation label for the image 301-1, or a semantic segmentation label generated in the way as shown in FIG. 2. The semantic segmentation label 304-2 may be an initial semantic segmentation label for the image 301-2, or a semantic segmentation label generated in the way as shown in FIG. 2. Although FIG. 3 only illustrates the processing on one pair of images, it is merely for illustrative purpose and does not suggest any limitation to the scope of the present disclosure. In some embodiments, the image processing apparatus 130 may obtain more than two images from the image set 101 for processing.

In some embodiments, as shown in FIG. 3, for each image of the images 301-1 and 301-2, the image processing apparatus 130 may use an image semantic segmentation model 310 to predict corresponding semantic categories of a plurality of images in the image. The image semantic segmentation model 310 may be the same as or different to the target semantic segmentation model 104. For example, the image semantic segmentation model 310 may be pre-trained image semantic segmentation model, or a preliminarily trained image semantic segmentation model, or an image semantic segmentation model which has not been trained. That is, the image semantic segmentation model 310 may be implemented using a semantic segmentation model with lower prediction accuracy or other algorithm or apparatus that can realize the semantic segmentation function.

The image processing apparatus 130 may further determine corresponding scores of a plurality of pixels in each image based on a semantic prediction result of the image, wherein the score of each pixel may indicate a degree of correlation between the pixel and a noisy area in the image. In other words, the score of each pixel may indicate a degree of difficulty in predicting a semantic category of the pixel. As shown in FIG. 3, corresponding scores of a plurality of pixels in the image 301-1 may be represented by a heat map 302-1, and corresponding scores of a plurality of pixels in the image 301-2 may be represented by a heat map 302-2.

In some embodiments, for each pixel in each image, the image processing apparatus 130 may determine a score of the pixel based on the difference between a predicted semantic category of the pixel and a ground-truth semantic category of the pixel, wherein the ground-truth semantic category of the pixel is indicated by a semantic segmentation label for the image. For example, the image semantic segmentation model 310 may predict a corresponding probability that each pixel in each image belongs to different semantic categories, and the semantic segmentation label for the image may indicate a ground-truth semantic category to which each pixel belongs. The image processing apparatus 130 may calculate the loss between the probability predicted by the image semantic segmentation model 310 that each pixel belongs to its ground-truth semantic category and a predetermined probability value (e.g., 100%), as the score of each pixel. That is, the higher the score of a pixel, the larger the difference between the predicted semantic category and the ground-truth semantic category of the pixel.

Alternatively, in some embodiments, for each pixel in each image, the image processing apparatus 130 may determine the score of the pixel based on the uncertainty or degree of confusion (e.g., entropy) of the predicted semantic category of the pixel. For example, the image semantic segmentation model 310 may predict a corresponding probability that each pixel in each image belongs to different semantic categories. The image processing apparatus 130 may use any appropriate algorithm that is known or will be developed in future to determine the uncertainty or degree of confusion of a predicted semantic category of each pixel based on the corresponding predicted probability that the pixel belongs to different semantic categories, as the score of the pixel. That is, the higher the score of the pixel, the higher the uncertainty or degree of confusion of the predicted semantic category of the pixel.

In some embodiments, as shown in FIG. 2, the image processing apparatus 130 may determine an image mask 303-1 corresponding to the image 301-1 based on the heat map 302-1 that indicates corresponding scores of a plurality of pixels in the image 301-1. Similarly, the image processing apparatus 130 may determine an image mask 303-2 corresponding to the image 301-2 based on the heat map 302-2 that indicates corresponding scores of a plurality of pixels in the image 301-2.

In some embodiments, the image processing apparatus 130 may rank the scores of a plurality of pixels in each image in a decreasing order and then select bottom N % pixels or select pixels whose scores are lower than a threshold score n. For example, the value of N % or n may be determined according to the verification experiment. The image processing apparatus 130 may generate an image mask of the image by setting a mask value at a position corresponding to the selected pixel as 1 and setting mask values at other positions as 0. Alternatively, in some embodiments, the image processing apparatus 130 may rank the scores of all pixels in a batch of images in a decreasing order and select bottom N % pixels or select pixels whose scores are lower than the threshold score n. For example, the value of N % or n may be determined according to the verification experiment. The image processing apparatus 130 may generate an image mask of each image in the batch of images by setting a mask value at a position corresponding to the selected pixel as 1 and setting mask values at other positions as 0. Alternatively, in other embodiments, the image processing apparatus 130 may also directly use a heap map that indicates corresponding scores of a plurality of pixels in each image as an image mask of the image.

In some embodiments, as shown in FIG. 2, the image processing apparatus 130 may perform a masking operation (i.e., point multiplication) on the image mask 303-1 and the semantic segmentation label 304-1 of the image 301-1 to generate a semantic segmentation label 305-1 of the image 301-1. Similarly, the image processing apparatus 130 may perform a masking operation (i.e., point multiplication) on the image mask 303-2 and the initial semantic segmentation label 304-2 of the image 301-2 to generate a semantic segmentation label 305-2 of the image 301-2. As shown in FIG. 2, the re-generated semantic segmentation labels 305-1 and 305-2 retain semantic segmentation labels in the semantic segmentation labels 304-1 and 304-2 corresponding to those pixels in the target areas (i.e., areas with lower noise) and ignore semantic segmentation labels of those pixels in non-target areas.

In some embodiments, as shown in FIG. 3, the image processing apparatus 130 may further generate a mixup image 306 and its semantic segmentation label 307 based on the plurality of images 301-1, 301-2 and the re-generated semantic segmentation labels 305-1 and 305-2. In some embodiments, the image processing apparatus 130 may calculate a weighted sum of the plurality of images 301-1 and 301-2 based on corresponding weights of the plurality of images 301-1 and 301-2, to obtain the mixup image 306. The image processing apparatus 130 may calculate a weighted sum of the semantic segmentation labels 305-1 and 305-2 based on corresponding weights of the plurality of images 301-1 and 301-2, to obtain the semantic segmentation label 307 of the mixup image 306. It should be understood that the image processing apparatus 130 may also use other methods to generate the mixup image 306 and its semantic segmentation label 307. As shown in FIG. 3, the mixup image 306 and its semantic segmentation label 307 may be used as a training sample in the training dataset 103 shown in FIG. 1 to train the target semantic segmentation model 104.

Figure 4:
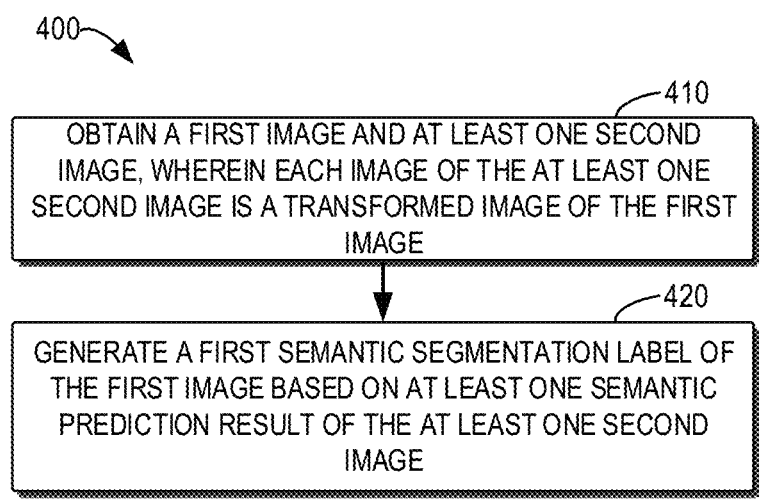
FIG. 4 shows a flowchart of an example method for image processing according to embodiments of the present disclosure.

FIG. 4 shows a flowchart of an example method 400 for image processing according to embodiments of the present disclosure. For example, the method 400 may be performed by the image processing apparatus 130 as shown in FIG. 1. The method 400 is to be described in conjunction with FIGS. 1 and 2. It should be understood that the method 400 may further comprise additional block(s) that is not shown and/or may omit some block(s) which are shown. The scope of the present disclosure is not limited in this regard.

At block 410, a first image and at least one second image (e.g., the transformed images 201-1~201-4 as shown in FIG. 2) are obtained, wherein each image of the at least one second image is a transformed image of the first image.

At block 420, a first semantic segmentation label (e.g., the semantic segmentation label 203 and/or 204 as shown in FIG. 2) of the first image is generated based on at least one semantic prediction result (e.g., the semantic confidence labels 202-1~202-4 as shown in FIG. 2) of the at least one second image.

In some embodiments, obtaining the at least one second image comprises: obtaining the at least one second image by performing image augmentation on the first image. The image augmentation comprises at least one of: mirror transformation, rotation, scaling, cropping, translation, brightness modification, adding noise, and changing colors.

In some embodiments, the method 300 further comprises: generating, using an image semantic segmentation model, at least one semantic segmentation label or at least one semantic confidence label for the at least one second image as the at least one semantic prediction result, wherein the at least one semantic confidence label indicates the confidence of each pixel in the at least one second image belonging to a predetermined semantic category.

In some embodiments, generating the first semantic segmentation label comprises: performing inverse transformation corresponding to the image augmentation on the at least one semantic prediction result to obtain at least one inversely-transformed semantic prediction result; and generating the first semantic segmentation label based on the at least one inversely-transformed semantic prediction result.

Figure 5:
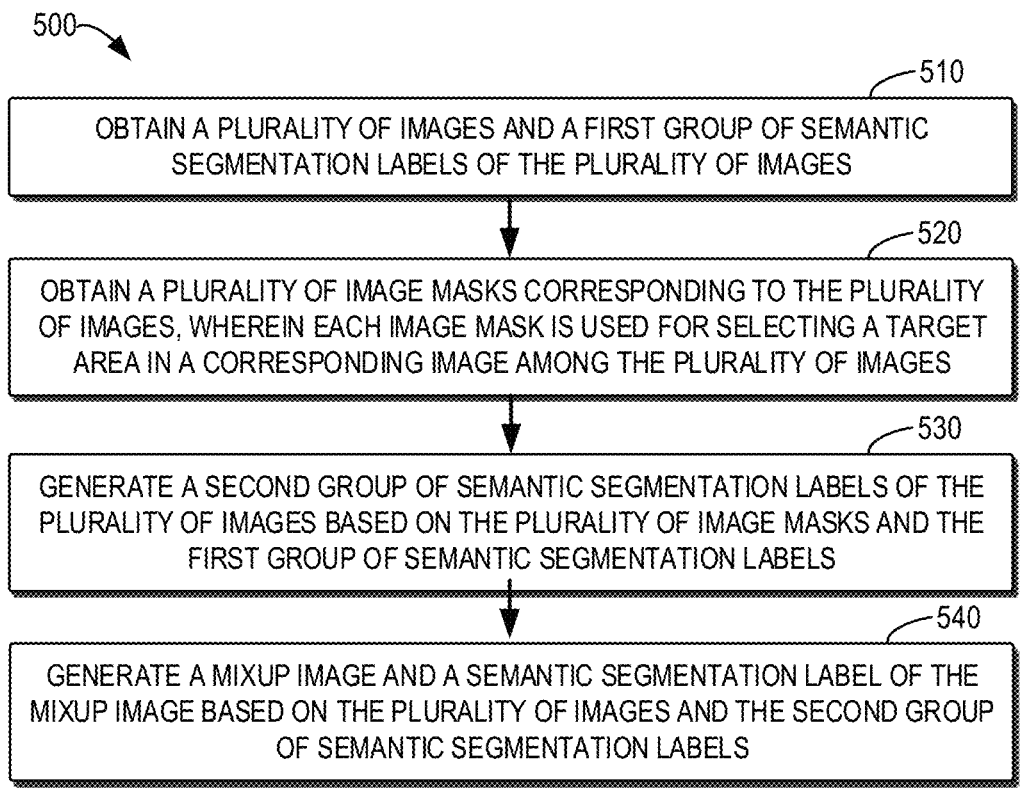
FIG. 5 shows a flowchart of an example method for image processing according to embodiments of the present disclosure.

FIG. 5 shows a flowchart of an example method 500 for image processing according to embodiments of the present disclosure. For example, the method 500 may be performed by the image processing apparatus 130 as shown in FIG. 1. The method 500 is to be described in conjunction with FIGS. 1 and 2. It should be understood that the method 500 may further comprise additional block(s) that is not shown and/or may omit some block(s) which are shown. The scope of the present disclosure is not limited in this regard.

At block 510, a plurality of images (e.g., the images 301-1 and 301-2 as shown in FIG. 3) and a first set of semantic segmentation labels (e.g., the semantic segmentation labels 304-1 and 304-2 as shown in FIG. 3) of the plurality of images are obtained. In some embodiments, the plurality of images comprises a first image, and the first set of semantic segmentation labels comprise a first semantic segmentation label for the first image.

At block 520, a plurality of image masks (e.g., the image masks 303-1 and 303-2 as shown in FIG. 3) corresponding to the plurality of images are obtained, wherein each image mask is used for selecting a target area in a corresponding image of the plurality of images.

In some embodiments, obtaining a plurality of image masks corresponding to the plurality of images comprises: determining corresponding predicted semantic categories of a plurality of pixels in the first image; determining corresponding scores of the plurality of pixels based on corresponding predicted semantic categories of the plurality of pixels, wherein the score of each pixel indicates a degree of correlation between the pixel and a noisy area in the first image; and determining a first image mask of the first image based on corresponding scores of the plurality of pixels, wherein the first image mask is used for selecting at least part of pixels with lower scores among the plurality of pixels.

In some embodiments, determining corresponding predicted semantic categories of a plurality of pixels in the first image comprises: determining, using an image semantic segmentation model, corresponding predicted semantic categories of the plurality of pixels in the first image.

In some embodiments, determining corresponding scores of a plurality of pixels in the first image comprises: for each pixel of the plurality of pixels, determining the score of the pixel based on any one of: the difference between a predicted semantic category of the pixel and a ground-truth semantic category of the pixel, wherein the ground-truth semantic category of the pixel is indicated by a semantic segmentation label for the first image; the uncertainty of the predicted semantic category of the pixel; and a degree of confusion of the predicted semantic category of the pixel.

At block 530, a second set of semantic segmentation labels (e.g., the semantic segmentation labels 305-1 and 305-2 as shown in FIG. 3) of the plurality of images are generated based on the plurality of image masks and the first set of semantic segmentation labels.

In some embodiments, the plurality of image masks comprise a first image mask corresponding to the first image, and generating the second set of semantic segmentation labels comprises: generating a second semantic segmentation label for the first image by performing a masking operation on the first semantic segmentation label and the first image mask, wherein the second set of semantic segmentation labels comprise the second semantic segmentation label.

At block 540, a mixup image (e.g., the mixup image 306 as shown in FIG. 3) and a semantic segmentation label (e.g., the semantic segmentation label 307 as shown in FIG. 3) of the mixup image are generated based on the plurality of images and the second set of semantic segmentation labels.

In some embodiments, generating a mixup image and a semantic segmentation label for the mixup image comprises: calculating a weighted sum of the plurality of images based on corresponding weights of the plurality of images, to generate the mixup image; and calculating a weighted sum of the second set of semantic segmentation labels based on corresponding weights of the plurality of images, to generate a semantic segmentation label for the mixup image.

Figure 6:
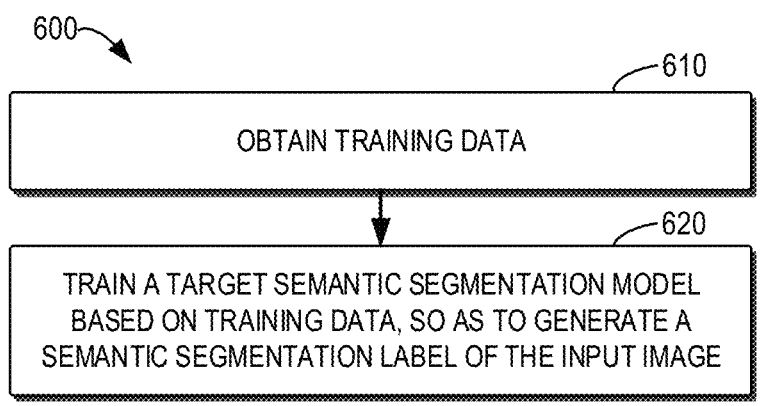
FIG. 6 shows a flowchart of an example method for model training according to embodiments of the present disclosure.

FIG. 6 shows a flowchart of an example method 600 for model training according to embodiments of the present disclosure. For example, the method 600 may be performed by the model training apparatus 140 as shown in FIG. 1. The method 600 is to be described in conjunction with FIGS. 1 and 2. It should be understood that the method 600 may further comprise additional block(s) that is not shown and/or may omit some block(s) which is (are) shown. The scope of the present disclosure is not limited in this regard.

At block 610, training data is obtained. For example, the model training apparatus 140 may obtain the training data from the training dataset 103 as shown in FIG. 1. In some embodiments, the obtained training data may comprise a first training sample, e.g., the first training sample comprises a first image and a first semantic segmentation label obtained according to the method 400. Additionally or alternatively, in some embodiments, the obtained training data may comprise a second training sample, e.g., the second training sample comprises a mixup image and a semantic segmentation label for the mixup image obtained according to the method 500.

At block 620, a target semantic segmentation model (e.g., the target semantic segmentation model 104 as shown in FIG. 1) is trained based on the training data, to be used to generate a semantic segmentation label for an input image. In some embodiments, the model training apparatus 140 may perform model training based on the obtained training data, to determine model parameters of the target semantic segmentation model 104.

Figure 7:
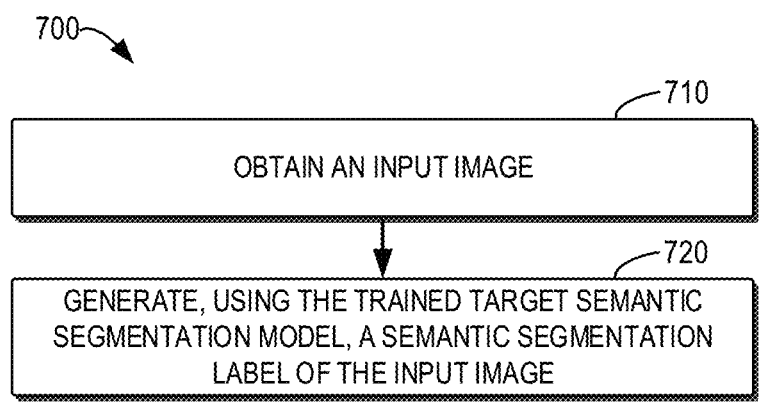
FIG. 7 shows a flowchart of an example method for image processing according to embodiments of the present disclosure.

FIG. 7 shows a flowchart of an example method 700 for image processing according to embodiments of the present disclosure. For example, the method 700 may be performed by the model applying apparatus 150 as shown in FIG. 1. The method 700 is to be described in conjunction with FIGS. 1 and 2. It should be understood that the method 700 may further comprise additional block(s) that is not shown and/or may omit some block(s) which is (are) shown. The scope of the present disclosure is not limited in this regard.

At block 710, an input image (e.g., the input image 105 as shown in FIG. 1) is obtained. At block 720, a semantic segmentation label (e.g., the semantic segmentation label 106 as shown in FIG. 1) of the input image is generated using the trained target semantic segmentation model, wherein the semantic segmentation label indicates a semantic category of a pixel in the input image. For example, the generated semantic segmentation label 106 may be a vector or an array that indicates a semantic category of each pixel in the input image 105, or may be a visual image as shown in FIG. 1, wherein pixels of different semantic categories may be filled with different colors.

As can be seen from the above description, embodiments of the present disclosure can effectively reduce the influence of training data with noisy labels on model training, thereby increasing the precision of the trained image semantic segmentation model. Embodiments of the present disclosure can be applicable to weakly supervised learning scenarios, wherein an initial training dataset might comprise limited, noisy or inaccurately annotated training samples. Embodiments of the present disclosure can optimize such training data and perform model training with optimized training data.

In addition to being applicable to semantic segmentation tasks, embodiments of the present disclosure can further be applicable to instance segmentation tasks. As described above, the objective of a semantic segmentation task is to identify a semantic category to which each pixel in an image belongs. Unlike the semantic segmentation task, the objective of an instance segmentation task is to identify an instance category to which each pixel in an image belongs. For example, the semantic segmentation task can classify pixels in the image, which belong to persons, into the same category, and the instance segmentation task can classify pixels in the image, which belong to different persons, into different categories.

In order to apply embodiments of the present disclosure to the instance segmentation tasks, the initial semantic label 102 annotated for each image 101 needs to indicate an instance category to which each pixel in the image belongs. For example, if semantic categories of two pixels are both "person" but correspond to different persons, then the two pixels will be annotated as belonging to different instance categories. The subsequent processing flow is similar to the above-described processing flow for the semantic segmentation tasks, and thus is not detailed here.

Figure 8:
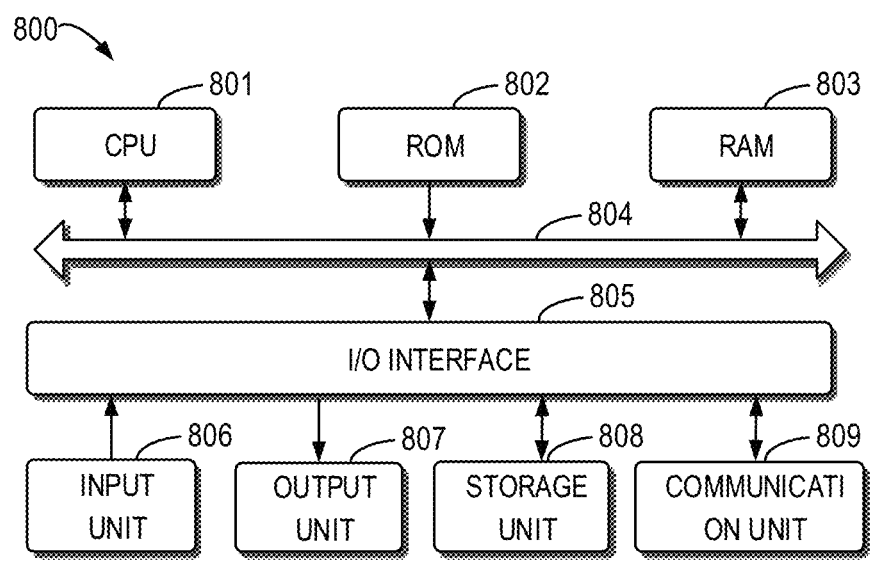
FIG. 8 shows a schematic block diagram of an example computing device which is applicable to implement embodiments of the present disclosure.

FIG. 8 shows a schematic block diagram of an example computing device 800 suitable for implementing embodiments of the present disclosure. For example, one or more apparatuses in system 100 as shown in FIG. 1 may be implemented by the device 800. Examples of the device 800 may include any general-purpose computer(s), special-purpose computer(s), server(s), virtual machine(s), and any other electronic device(s) with computing capabilities (such as user equipment, mobile phone(s), cellular phone(s), smart phone(s), personal digital assistant(s), image capture device(s) (such as digital camera(s)), gaming device(s), music storage and playback device(s), or Internet device(s) that enable wireless or wired Internet access and browsing, etc.).

As shown in this figure, the device 800 comprises a central processing unit (CPU) 801 (also referred to as "processor 801") which is capable of performing various appropriate actions and processes in accordance with computer program instructions stored in a read only memory (ROM) 802 or computer program instructions loaded from a storage unit 808 to a random access memory (RAM) 803. In the RAM 803, there are also stored various programs and data required by the device 800 when operating. The CPU 801, the ROM 802 and the RAM 803 are connected to one another via a bus 804. An input/output (I/O) interface 805 is also connected to the bus 804.

Multiple components in the device 800 are connected to the I/O interface 805, those components comprising: an input unit 806, such as a keyboard, a mouse, or the like; an output unit 807, such as various types of displays, a loudspeaker or the like; a storage unit 808, such as a disk, an optical disk or the like; and a communication unit 809, such as a LAN card, a modem, a wireless communication transceiver or the like. The communication unit 809 enables the device 800 to exchange information/data with other device via a computer network, such as the Internet, and/or various telecommunication networks.

The processor 801 may be configured to execute the above-described procedures and processes, such as the methods 400, 500, 600 and/or 700. For example, in some embodiments, the methods 400, 500, 600 and/or 700 may be implemented as a computer software program, which is tangibly embodied in a machine readable medium, e.g. the storage unit 808. In some embodiments, part or the entirety of the computer program may be loaded to and/or installed on the device 800 via the ROM 802 and/or the communication unit 809. The computer program, when loaded to the RAM 803 and executed by the CPU 801, may execute one or more steps of the methods 400, 500, 600 and/or 700 as described above.

In some embodiments, a computing device comprises at least one circuit, which is configured to: obtain a first image and at least one second image, wherein each image of the at least one second image is a transformed image of the first image; and generate a first semantic segmentation label for the first image based on at least one semantic prediction result of the at least one second image.

In some embodiments, the at least one circuit is configured to: obtain the at least one second image by performing image augmentation on the first image.

In some embodiments, the image augmentation comprises at least one of: mirror transformation, rotation, scaling, cropping, translation, brightness modification, adding noise, and changing colors.

In some embodiments, the at least one circuit is further configured to: generate, using an image semantic segmentation model, at least one semantic segmentation label or at least one semantic confidence label for the at least one second image as the at least one semantic prediction result, wherein the at least one semantic confidence label indicates the confidence of each pixel in the at least one second image belonging to a predetermined semantic category.

In some embodiments, the at least one circuit is configured to: perform inverse transformation corresponding to the image augmentation on the at least one semantic prediction result to obtain at least one inversely-transformed semantic prediction result; and generate the at least one semantic segmentation label based on the at least one inversely-transformed semantic prediction result.

In some embodiments, the at least one circuit is further configured to: obtain a plurality of images and a first set of semantic segmentation labels of the plurality of images, wherein the plurality of images comprise the first image, and the first set of semantic segmentation labels comprise the first semantic segmentation label; obtain a plurality of image masks corresponding to the plurality of images, wherein each image mask is used for selecting a target area in a corresponding image of the plurality of images; generate a second set of semantic segmentation labels of the plurality of images based on the plurality of image masks and the first set of semantic segmentation labels; and generate a mixup image and a semantic segmentation label for the mixup image based on the plurality of images and the second set of semantic segmentation labels.

In some embodiments, the at least one circuit is configured to: determine corresponding predicted semantic categories of a plurality of pixels in the first image; determine corresponding scores of the plurality of pixels based on corresponding predicted semantic categories of the plurality of pixels, wherein the score of each pixel indicates a degree of correlation between the pixel and a noisy area in the first image; and determine a first image mask of the first image based on corresponding scores of the plurality of pixels, wherein the first image mask is used for selecting at least part of pixels with lower scores of the plurality of pixels.

In some embodiments, the at least one circuit is configured to: determine, using an image semantic segmentation model, corresponding predicted semantic categories of the plurality of pixels in the first image.

In some embodiments, the at least one circuit is configured to: for each pixel of the plurality of pixels, determine the score of the pixel based on any one of: the difference between a predicted semantic category of the pixel and a ground-truth semantic category of the pixel, wherein the ground-truth semantic category of the pixel is indicated by a semantic segmentation label for the first image; the uncertainty of the predicted semantic category of the pixel; and a degree of confusion of the predicted semantic category of the pixel.

In some embodiments, the plurality of image masks comprise a first image mask corresponding to the first image, and the at least one circuit is configured to: generate a second semantic segmentation label for the first image by performing a masking operation on the first semantic segmentation label and the first image mask, wherein the second set of semantic segmentation labels comprise the second semantic segmentation label.

In some embodiments, the at least one circuit is configured to: calculate a weighted sum of the plurality of images based on corresponding weights of the plurality of images, to generate the mixup image; and calculate a weighted sum of the second set of semantic segmentation labels based on corresponding weights of the plurality of images, to generate a semantic segmentation label for the mixup image.

In some embodiments, the at least one circuit is further configured to: obtain training data, wherein the training data comprises at least one of: a first training sample, comprising the first image and the first semantic segmentation label; and a second training sample, comprising the mixup image and the semantic segmentation label for the mixup image; and train a target semantic segmentation model based on the training data, to be used to generate a semantic segmentation label for an input image.

In some embodiments, the at least one circuit is further configured to: obtain the input image; and generate a semantic segmentation label for the input image using the trained target semantic segmentation model.

The present disclosure may be implemented as a system, a method, and/or a computer program product. When the present disclosure is implemented as a system, apart from being integrated on an individual device, the components described herein may also be implemented in the form of a cloud computing architecture. In the cloud computing environment, these components may be remotely arranged and may cooperate to implement the functions described by the present disclosure. The cloud computing may provide computation, software, data access and storage services without informing a terminal user of physical locations or configurations of systems or hardware providing such services. The cloud computing provides services via a Wide Area Network (such as Internet) using a suitable protocol. For example, the cloud computing provider provides, via the Wide Area Network, the applications, which can be accessed through a web browser or any other computing component. Components of the cloud computing and corresponding data may be stored on a remote server. The computing resources in the cloud computing environment may be merged at a remote datacenter or distributed. The cloud computing infrastructure may provide, via a shared datacenter, the services even though they appear to be a single access point for the user. Therefore, various functions described herein can be provided using the cloud computing architecture from a remote service provider. Alternatively, the various functions may also be provided from a conventional server, or they may be mounted on a client device directly or in other ways. In addition, the present disclosure may further be implemented as a computer program product, which may include a computer-readable storage medium (or media) having computer-readable program instructions thereon for executing various aspects of the present disclosure.

The computer-readable storage medium can be a tangible device that can retain and store instructions for use by an instruction executing device. The computer-readable storage medium may be, for example, but is not limited to, an electronic storage device, a magnetic storage device, an optical storage device, an electromagnetic storage device, a semiconductor storage device, or any suitable combination thereof. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination thereof. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical fiber transmissions, wireless transmission, routers, firewalls, switches, gateway computers and/or edge servers. A network adapter card or network interface in each computing/processing device receives computer-readable program instructions from the network and forwards the computer-readable program instructions to be stored in a computer-readable storage medium within the respective computing/processing device.

Computer program instructions for executing operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In a scenario where a remote computer is involved, the remote computer may be connected to the user's computer through any type of network, including a local area network (LAN) or a wide area network (WAN), or the remote computer may be connected to an external computer (for example, through the Internet using an Internet Service Provider). In some embodiments, by utilizing state information of the computer-readable program instructions to customize the electronic circuitry, such as a programmable logic circuitry, a field-programmable gate arrays (FPGA), or a programmable logic arrays (PLA), the electronic circuitry may execute the computer-readable program instructions, thereby implementing various aspects of the present disclosure.

Various aspects of the present disclosure are described herein with reference to flowcharts and/or block diagrams of methods, apparatus (systems), and computer program products according to embodiments of the present disclosure. It should be understood that each block of the flowcharts and/or block diagrams, and combinations of blocks in the flowcharts and/or block diagrams, can be implemented by computer-readable program instructions.

These computer-readable program instructions may be provided to a processing unit of a general purpose computer, a special purpose computer, or other programmable data processing apparatus to produce a machine, such that the instructions, when executed via the processing unit of the computer or other programmable data processing apparatus, create means for implementing the functions/actions specified in one or more blocks in the flowcharts and/or block diagram blocks. These computer-readable program instructions may also be stored in a computer-readable storage medium that can direct a computer, a programmable data processing apparatus, and/or other devices to function in a particular manner, such that the computer-readable storage medium having instructions stored thereon comprises an article of manufacture including instructions which implement various aspects of the functions/actions specified in one or more blocks in the flowcharts and/or block diagrams.

The computer-readable program instructions may also be loaded onto a computer, other programmable data processing apparatus, or other device to cause a series of operational steps to be performed on the computer, other programmable apparatus or other device to produce a computer implemented process, such that the instructions, when executed on the computer, other programmable apparatus, or other device, implement the functions/actions specified in one or more blocks in the flowcharts and/or block diagrams.

The flowcharts and block diagrams in the figures illustrate the possible architecture, functionality, and operation of systems, methods and computer program products according to various embodiments of the present disclosure. In this regard, each block in the flowcharts or block diagrams may represent a module, segment, or portion of code, which comprises one or more executable instructions for implementing the specified logical function(s). In some alternative implementations, the functions noted in the blocks may occur in an order different from that noted in the figures. For example, two successive blocks may, in fact, be executed substantially concurrently, or the blocks may sometimes be executed in the reverse order, depending upon the functionality involved. It should also be noted that each block in the block diagrams and/or flowcharts, and combinations of blocks in the block diagrams and/or flowcharts, can be implemented by special purpose hardware-based systems that perform the specified functions or actions, or combinations of special purpose hardware and computer instructions.

The descriptions of the various embodiments of the present disclosure have been presented for illustrative purpose, but are not intended to be exhaustive or limited to embodiments disclosed. Many modifications and variations will be apparent to those of ordinary skill in the art without departing from the scope or spirit of the described embodiments. The terminology used herein was chosen to best explain the principles of embodiments, the practical application or technical improvement over technologies found in the marketplace, or to enable others of ordinary skill in the art to understand embodiments disclosed herein.

We claim:

1. A method of image processing, comprising:
    obtaining a first image and at least one second image, wherein each image of the at least one second image is a transformed image of the first image;
    generating a first semantic segmentation label for the first image based on at least one semantic prediction result of the at least one second image;
    obtaining a plurality of images and a first set of semantic segmentation labels for the plurality of images, wherein the plurality of images comprise the first image, and the first set of semantic segmentation labels comprise the first semantic segmentation label;
    obtaining a plurality of image masks corresponding to the plurality of images, wherein each image mask is used for selecting a target area in a corresponding image of the plurality of images;
    generating a second set of semantic segmentation labels of the plurality of images based on the plurality of image masks and the first set of semantic segmentation labels; and
    generating a mixup image and a semantic segmentation label for the mixup image based on the plurality of images and the second set of semantic segmentation labels;
    wherein obtaining a plurality of image masks corresponding to the plurality of images comprises:
    determining corresponding predicted semantic categories of a plurality of pixels in the first image;
    determining corresponding scores of the plurality of pixels based on corresponding predicted semantic categories of the plurality of pixels, wherein the score of each pixel indicates a degree of correlation between the pixel and a noisy area in the first image; and
    determining a first image mask of the first image based on corresponding scores of the plurality of pixels, wherein the first image mask is used for selecting at least part of pixels with lower scores among the plurality of pixels.

2. The method according to claim 1, wherein obtaining the at least one second image comprises:
    obtaining the at least one second image by performing image augmentation on the first image.

3. The method according to claim 2, wherein the image augmentation comprises at least one of: mirror transformation, rotation, scaling, cropping, translation, brightness modification, adding noise, and changing color.

4. The method according to claim 1, further comprising:
    generating, using an image semantic segmentation model, at least one semantic segmentation label or at least one semantic confidence label for the at least one second image as the at least one semantic prediction result,
    wherein the at least one semantic confidence label indicates a confidence of each pixel in the at least one second image belonging to a predetermined semantic category.

5. The method according to claim 2, wherein generating the first semantic segmentation label comprises:
    performing inverse transformation corresponding to the image augmentation on the at least one semantic prediction result respectively, to obtain at least one inversely-transformed semantic prediction result; and
    generating the at least one semantic segmentation label based on the at least one inversely-transformed semantic prediction result.

6. The method according to claim 1, wherein the plurality of image masks comprise a first image mask corresponding to the first image, and generating the second set of semantic segmentation labels comprises:
    generating a second semantic segmentation label for the first image by performing a masking operation on the first semantic segmentation label and the first image mask, wherein the second set of semantic segmentation labels comprise the second semantic segmentation label.

7. The method according to claim 1, wherein generating a mixup image and a semantic segmentation label for the mixup image comprises:
    calculating a weighted sum of the plurality of images based on corresponding weights of the plurality of images, to generate the mixup image; and calculating a weighted sum of the second set of semantic segmentation labels based on corresponding weights of the plurality of images, to generate a semantic segmentation label for the mixup image.

8. The method according to claim 1, further comprising:
obtaining training data, wherein the training data comprises at least one of:
a first training sample, comprising the first image and the first semantic segmentation label; and
a second training sample, comprising the mixup image and the semantic segmentation label for the mixup image; and
training, based on the training data, a target semantic segmentation model to generate a semantic segmentation label for an input image.

9. A computing device, comprising:
at least one processor, configured to:
obtain a first image and at least one second image, wherein each image of the at least one second image is a transformed image of the first image;
generate a first semantic segmentation label for the first image based on at least one semantic prediction result of the at least one second image;
obtain a plurality of images and a first set of semantic segmentation labels for the plurality of images, wherein the plurality of images comprise the first image, and the first set of semantic segmentation labels comprise the first semantic segmentation label;
obtain a plurality of image masks corresponding to the plurality of images, wherein each image mask is used for selecting a target area in a corresponding image of the plurality of images;
generate a second set of semantic segmentation labels of the plurality of images based on the plurality of image masks and the first set of semantic segmentation labels;
generate a mixup image and a semantic segmentation label for the mixup image based on the plurality of images and the second set of semantic segmentation labels;
calculate a weighted sum of the plurality of images based on corresponding weights of the plurality of images, to generate the mixup image; and
calculate a weighted sum of the second set of semantic segmentation labels based on corresponding weights of the plurality of images, to generate a semantic segmentation label for the mixup image.

10. The computing device according to claim 9, wherein the at least one processor is configured to:
obtain the at least one second image by performing image augmentation on the first image.

11. The computing device according to claim 10, wherein the image augmentation comprises at least one of: mirror transformation, rotation, scaling, cropping, translation, brightness modification, adding noise, and changing color.

12. The computing device according to claim 9, wherein the at least one processor is further configured to:
generate, using an image semantic segmentation model, at least one semantic segmentation label or at least one semantic confidence label for the at least one second image as the at least one semantic prediction result,
wherein the at least one semantic confidence label indicates a confidence of each pixel in the at least one second image belonging to a predetermined semantic category.

13. The computing device according to claim 10, wherein the at least one processor is configured to:
perform inverse transformation corresponding to the image augmentation on the at least one semantic prediction result respectively, to obtain at least one inversely-transformed semantic prediction result; and
generate the at least one semantic segmentation label based on the at least one inversely-transformed semantic prediction result.

14. The computing device according to claim 9, wherein the at least one processor is configured to:
determine corresponding predicted semantic categories of a plurality of pixels in the first image;
determine corresponding scores of the plurality of pixels based on corresponding predicted semantic categories of the plurality of pixels, wherein the score of each pixel indicates a degree of correlation between the pixel and a noisy area in the first image; and
determine a first image mask of the first image based on corresponding scores of the plurality of pixels, wherein the first image mask is used for selecting at least part of pixels with lower scores among the plurality of pixels.

15. The computing device according to claim 9, wherein the plurality of image masks comprise a first image mask corresponding to the first image, and the at least one processor is configured to:
generate a second semantic segmentation label for the first image by performing a masking operation on the first semantic segmentation label and the first image mask, wherein the second set of semantic segmentation labels comprise the second semantic segmentation label.

16. The computing device according to claim 9, wherein the at least one processor is further configured to:
obtain training data, wherein the training data comprises at least one of:
a first training sample, comprising the first image and the first semantic segmentation label; and
a second training sample, comprising the mixup image and the semantic segmentation label for the mixup image; and
train, based on the training data, a target semantic segmentation model to generate a semantic segmentation label for an input image.

* * * * *